United States Patent [19]

Gigl

[11] Patent Number: 4,525,179
[45] Date of Patent: Jun. 25, 1985

[54] PROCESS FOR MAKING DIAMOND AND CUBIC BORON NITRIDE COMPACTS

[75] Inventor: Paul D. Gigl, Worthington, Ohio

[73] Assignee: General Electric Company, Worthington, Ohio

[21] Appl. No.: 542,081

[22] Filed: Oct. 14, 1983

Related U.S. Application Data

[63] Continuation-in-part of Ser. No. 487,115, Apr. 27, 1983, abandoned, which is a continuation of Ser. No. 287,010, Jul. 27, 1981, abandoned.

[51] Int. Cl.³ .............................................. B24D 3/02
[52] U.S. Cl. ......................................... 51/309; 51/307
[58] Field of Search .................................. 51/307, 309

[56] References Cited

U.S. PATENT DOCUMENTS

| | | | |
|---|---|---|---|
| 2,992,900 | 7/1961 | Bovenkerk | 23/209.1 |
| 3,106,973 | 10/1963 | Christensen | 175/413 |
| 3,141,746 | 7/1964 | De Lai | 51/309 |
| 3,435,399 | 3/1969 | Gielisse et al. | 338/22 |
| 3,609,818 | 10/1971 | Wentrof, Jr. | 425/77 |
| 3,702,573 | 11/1972 | Nemeth | 51/309 |
| 3,745,623 | 7/1973 | Wentrof, Jr. | 407/119 |
| 3,785,093 | 1/1974 | Vereschagin et al. | 51/309 |
| 3,831,428 | 8/1974 | Wentrof, Jr. | 72/467 |
| 3,850,591 | 11/1974 | Wentorf, Jr. | 51/307 |
| 3,949,062 | 4/1976 | Vereschagin et al. | 51/307 |
| 4,063,909 | 12/1977 | Mitchell | 51/309 R |
| 4,108,614 | 8/1978 | Mitchell | 51/295 |
| 4,219,339 | 8/1980 | Wilson | 51/307 |
| 4,224,380 | 9/1980 | Bovenkerk et al. | 428/545 |
| 4,229,186 | 10/1980 | Wilson | 51/309 |
| 4,255,165 | 3/1981 | Dennis et al. | 51/309 |
| 4,333,986 | 6/1982 | Tsuji et al. | 51/309 |

FOREIGN PATENT DOCUMENTS

| | | |
|---|---|---|
| 5521 | 9/1977 | South Africa . |
| 1568202 | 5/1980 | United Kingdom . |

*Primary Examiner*—Paul Lieberman
*Assistant Examiner*—Willie Thompson
*Attorney, Agent, or Firm*—Robert R. Schroeder; Douglas B. Little

[57] ABSTRACT

The high pressure/high temperature (HP/HT) process for making diamond or CBN compacts has been modified by placing partitions within the crystal mass before HP/HT processing. With reference to FIG. 3, within the shield metal sleeve 11 and shield metal cup 14 are placed pliable metal shapes 20 in a honeycomb pattern. The abrasive crystals within the tubes 18 and outside the tubes 26 is sintered, and a compact containing the tubes embedded therein results. This compact can be acid leached to give a plurality of small compacts which need little if any additional shaping. The partitions can also be left intact as chip arresters.

37 Claims, 5 Drawing Figures

PROCESS FOR MAKING DIAMOND AND CUBIC BORON NITRIDE COMPACTS

This application is a continuation-in-part of application Ser. No. 487,115 filed Apr. 27, 1983, which is a continuation of application Ser. No. 287,010 filed July 27, 1983 both abandoned.

TECHNICAL FIELD

This invention is related to the high pressure/high temperature (HP/HT) process for making cubic boron nitride and diamond compacts. More particularly, it is related to a modification of the HP/HT process which can result in increased efficiency in the production of small compacts and in new types of compacts with improved characteristics.

BACKGROUND

A compact is a polycrystalline mass of abrasive particles (e.g. diamond and cubic boron nitride) bonded together to form an integral, tough, coherent, high-strength mass. A composite compact is a compact bonded to a substrate material, such as cemented, metal carbide (e.g. cobalt cemented tungsten carbide). The metal bonded carbide mass is generally selected from the group consisting of tungsten carbide, titanium carbide, tantalum carbide and mixtures thereof with metal bonding material therein normally being present in a quantity from about 6 to 25 weight percent and selected from the group consisting of cobalt, nickel, iron and mixtures thereof.

Compacts or composite compacts may be used as blanks for cutting tools, drill bits, dressing tools, and wear parts. Compacts made in a cylindrical configuration have been used to make wire drawing dies (see U.S. Pat. Nos. 3,831,428; 4,129,052; and 4,144,739).

One method for manufacturing compacts involves the steps of:

A. placing within a protective shield metal enclosure which is disposed within the reaction cell of a high pressure/high temperature apparatus;
(1) a mass of abrasive crystals (either diamond or cubic boron nitride (CBN); and
(2) a mass of catalyst metal in contact with the mass of abrasive crystals; and B. subjecting the contents of the cell to conditions of temperature, pressure and time sufficient to give intercrystal bonding between adjacent crystal grains.

For example, the mass of catalyst metal could be in the form of a disc of one of the well known catalysts for diamond or CBN crystallization. Under the HP/HT conditions, a compaction front advances through the dense diamond or CBN material, and the catalyst metal (in liquid form) makes itself available as a catalyst or solvent for recrystallization or intercrystalline bonding of the diamond or CBN grains. This process is sometimes known as the sweep through method, i.e., the catalyst sweeps through the diamond or CBN mass.

The relative shapes of the abrasive mass and catalyst can be varied. For example, the mass of diamond or CBN can be cylindrical, and the catalyst can be an annular shape surrounding the cylinder of abrasive crystals.

The source of catalyst may also be cemented metal carbide or carbide molding powder wherein the cementing agent is a catalyst or solvent for diamond or CBN recrystallization of growth.

The catalyst is generally selected from cobalt, nickel and iron or aluminum alloy in the case of CBN. The catalyst may be mixed with the abrasive crystals in addition to or instead of being a separate mass adjacent to the abrasive crystals.

Also, in place of abrasive grains such as diamond or CBN, one may choose to utilize as raw materials other sources of carbon or boron nitride such as graphite, hexagonal boron nitride or wurtzite boron nitride which would be converted to diamond or CBN respectively during the HP/HT process. Processes for such conversions are described in the patent literature, for example, U.S. Pat. Nos. 3,407,445 and 3,850,053 (for diamond) and British Pat. No. 1,317,716, U.S. Pat. Nos. 3,212,852 and 4,118,194 and U.S. Pat. No. 4,289,503 (for CBN), all of which are hereby incorporated by reference.

High temperature and high pressure in the diamond or CBN stable region are then applied for a time sufficient to bond the abrasive crystals together. The resulting compact is characterized particularly by diamond-to-diamond or CBN-to-CBN bonding, i.e., intercrystal bonding between adjacent grains whereby there are parts of the crystal lattice which are shaped between neighboring crystals (resulting from recrystallization at HP/HT conditions). Methods for making diamond compacts are detailed in U.S. Pat. Nos. 3,141,746; 3,745,623; 3,609,818; and 3,850,591; and processes for CBN compacts are disclosed in U.S. Pat. Nos. 3,233,988; 3,743,489; 3,767,371; and 4,188,194 (all of which are incorporated herein by reference).

The manufacture of thermally stable compacts is described in U.S. Pat. No. 4,224,380. This patent teaches the removal of substantially all of the metallic (catalyst) phase from compacts to yield a compact consisting essentially of self-bonded abrasive particles with an interconnected network of pores disposed throughout. Such compacts can withstand exposure to temperatures of about 1200° C. to 1300° C. without substantial thermal degradation, an advantage over the compacts of, for example, U.S. Pat. No. 3,745,623 which are thermally degraded at a temperature between 700° C. and 800° C. The metallic phase is removed by acid treatment, liquid zinc extraction, electrolytic depletion, or similar processes. The compacts of this type will be referred to throughout as thermally stable compacts.

The current manufacturing methods of thermally stable compacts require a post pressing step, such as laser cutting, grinding, or lapping, for shaping each piece to the desired configuration, (e.g. triangular or segment of a circle). This consumes time, labor and materials. Since diamond is the hardest known material and CBN the second hardest, the polycrystalline mass is most difficult to shape. The shaping step, whether by laser cutting, dicing with a diamond wheel, or other method, requires labor intensive handling for each final piece. This adds to the cost, logistics and time required to manufacture the product. The crushing or milling of large polycrystalline pieces is not a viable method because the shape cannot be controlled and only a small percentage of the desired particle size is obtained. The problem is, therefore, to eliminate the individual handling requirements for each piece while maintaining the desired shape of the pieces.

U.S. Pat. No. 3,949,062 describes one method for producing diamond compacts of a predetermined shape by surrounding a monolithic piece of graphite or a predetermined shape with catalyst and transforming it into polycrystalline diamond through a high pressure/high temperature process using a pulse of electric current.

U.S. Pat. No. 3,785,093 proposes making sintered diamond and cermet mixtures by exposing such mixtures to conditions within the graphite (non-diamond) stable region while contained within graphite shells which are in turn contained within shells made of low melting metals (e.g. zinc).

The diamond stable region is the range of pressure temperature conditions under which diamond is thermodynamically stable. On a pressure-temperature phase diagram, it is the high pressure side, above the equilibrium line between diamond and graphite. The cubic boron nitride stable region is the range of pressure temperature conditions under which cubic boron nitride is thermodynamically stable. On a pressure-temperature phase diagram, it is the high pressure side, above the equilibrium line between cubic boron nitride and hexagonal boron nitride.

In the case of normal (i.e. non-thermally stable) diamond or CBN compacts, there is another problem connected with their use, not the manufacturing finishing steps. Diamond and CBN compacts, such as those manufactured by the catalyst sweep through method, and very strong but very brittle materials. Once started, fractures can propagate through the diamond or CBN mass. The chips formed can be quite large and can limit the usefulness of the material. This is particularly true in the case of petroleum or rock drill bits where massive failure of the diamond layer of a composite compact can also lead to damage of the remaining cutters on the bit. A technique is needed which would reduce the massive failure caused by fractures propagating through a well bonded polycrystalline brittle material such as the diamond layer of compact cutters used in petroleum drill bits.

U.S. Pat. No. 4,255,165 describes a modification of composite compacts in which at least two connected metal carbide masses are bonded to and interleaved with at least two masses of polycrystalline diamond or CBN. This modification is said to provide internal reinforcement of the composite compact against massive fracture by enhancing resistance to crack propagation.

U.S. Pat. Nos. 4,063,909 and 4,108,614, as well as South African Patent Application No. 77/5521 disclose interposing a transition metal layer between the diamond particles and metal carbide of various types of composite compacts during manufacture.

British Pat. No. 1,568,202 discloses laminated compacts in which bonding between adjacent diamond layers takes place through a metal or alloy layer.

DISCLOSURE OF INVENTION

The difficulties discussed above can, to a great extent, be alleviated by embedding within the mass of abrasive crystals, before HP/HT sintering, at least one partition strip of a deformable material (e.g., metal or metal alloy) which extends through the shortest dimension of the abrasive crystal mass or layer. The strips may be oriented so as to segment or subdivide the abrasive crystal mass. In the cylindrical high pressure apparatus often used to make compacts, the strips are oriented longitudinally or parallel to its axis.

The partition strips should be deformable or pliable so that there is no bridging action or resistance by the partitions to the compression of the abrasive crystal mass. The abrasive crystal mass loses some of its volume (about 30%) during the compression of the HP/HT process, which loss must be accommodated. The partition strips should also be strong enough to maintain segregation between the portions of the subdivided abrasive crystal mass.

The partition strips may be in any convenient form, such as: flat strips, wire mesh, expanded metal, tubes, or closed shapes fabricated from flat metal pieces (e.g. triangle or star shape). The closed shapes describe discrete volumes within the abrasive crystal mass. The partition strips can be any catalyst or inert pliable material which does not interfere with the sintering sweep through mechanism and which can be easily removed by post pressing operations.

The partition strips are placed in the typical shield metal cup of the normal compact manufacturing process. The cup is then filled with diamond or CBN and, in the case of composite compacts, covered with a cemented metal carbide piece or carbide molding powder.

The uniqueness of this invention is based on the following discoveries:

1. When metal pieces which describe closed shapes (e.g. tubes in the shape of circles, triangles, rectangles, squares or stars) are used, the compact formed within the closed shape is maintained as a circle, triangle, rectangle, square or star after compression even though the diamond or CBN was in a molten metal envelope during the HP/HT process.

2. Group VII metals of the first transition series, which are readily available, can be used as the deformable metal strip or partition material between the CBN or diamond masses. When the reaction volume is compressed to HP conditions and then heated to sweep through temperature, the pore volume in the diamond or CBN is filled with molten catalyst metal, and the metal strip or partition remains in position. Of course, there is diffusion and alloying with the partition metal but the minimum volume will have already been obtained through the packing down and compression of the abrasive crystals, and separation of the compacted shapes or crystal masses is maintained.

3. The melting point of the materials within the reaction volume appear to be the controlling parameters when catalyst assisted sintering occurs. When a catalyst sweep-through process is employed and the partition or metal strip material is not a catalyst or solvent, or does not form an alloy with the catalyst to be swept through, the partition material should preferably have a melting point under conditions present in the reaction zone of the HP/HT cell, at least slightly higher (e.g. 20° C. higher) than the catalyst melting point. This is to prevent the partition strip from melting and becoming mobile before catalyst sweep through occurs. In that event, the catalyst would be blocked by the partition strip material which would have swept through the diamond or CBN ahead of the catalyst. When catalyst solvent materials or materials which alloy with catalyst solvent materials are used for the partitions, blockage of catalyst contact with the diamond or CBN is not a great concern. However, when these materials do not have a melting point higher than that of the catalyst to be swept through provided, it is important that sufficient partition material be provided initially in order to maintain segregation between the portions of the subdivided abrasive crystal mass. In particular, it is necessary to accommodate some diffusion of the lower melting point partition material into the inter-crystal area of the abrasive mass before the front of liquid sweep-through catalyst arrives. The foregoing was demonstrated in a series of tests involving diamond compacts formed with partition materials having the same or lower melting point than the sweep through catalyst. In one test cobalt was used as both the partition and sweep through catalyst material. In another test a cobalt partition was used in conjunction with a higher melting point nickel sweep through catalyst. Finally, a lower melting point non-catalytic copper partition was used with a cobalt sweep through catalyst with which it can form an alloy. In each case a disc of the sweep through catalyst was placed in the bottom of a refractory metal protective cup, and a partition-material strip formed into a cylindrical shape was placed on end on top of the disc. Diamond feed was poured into the cup until the barrier was just covered. A protective refractory metal disc was placed onto the diamond and then the cup was crimped over the disc. Press runs were made at the normal high pressure-high temperature conditions for good sintering of the diamond. In both the Co and Ni catalyst cases, the partition effect was maintained with a 0.005" (5 mil) thick Co barrier resulting in cylindrically shaped diamond compacts. The annular material around the cylinder typically fractured, but this did not effect the cylinder itself. A 0.005" (5 mil) copper partition was not as successful. In that case a portion of the Cu barrier completely diffused into the diamond powder so that segregation of the diamond material was not maintained. However, when the Cu barrier was tripled in thickness to 0.015" (15 mils), the segregation was complete and the resulting cylinder and annulus were successfully separated. These test indicate that the separation of compacted shapes can be maintained in a catalyst sweep through process according to this present invention even if lower melting point partition materials are used, provided an adequate partition thickness is selected and the partition material does not block the content of catalyst and the material to be catalyzed. A second series of tests indicate that the concern regarding the nature and thickness of partition materials is lessened in a configuration in which a catalyst is mixed with the abrasive crystals before high pressure-high temperature processing. These tests were similar to those noted above except that no catalyst disc was employed. Instead, cobalt powder was mixed with the diamond feed material to form a 80/20 diamond/cobalt weight percent mixture. In this configuration, a 0.005" (5 mil) thick copper partition maintained good segregation between the portions of the sub-divided diamond mass. This is thought to reflect a decreased diffusion of the partition material due to the occupation of at least a portion of the intercrystal void area at the partition material melt temperature by the powdered catalyst material. Good segregation was also obtained in this configuration with a 0.002" (2 mil) thick cobalt partition. However, a test using a 0.002" (2 mil) copper partition resulted in a diamond compact with incomplete segregation. In this regard, it must also be recognized that although the melting point of a material may be below the catalyst melting point at atmospheric pressure, it can be different at greatly elevated pressures and in the presence of diamond or graphite. For example, nickel melts below the melting point of cobalt normally, but at HP/HT conditions in the presence of diamond, nickel melts or forms a eutectic at about 1394° C. while the corresponding cobalt diamond eutectic occurs at about 1317° C. See Strong, H. M. and Tuft, R. E., "The Cobalt-Carbon System at 56 Kilobars," General Electric Company Technical Information Series, July, 1974; and Strong, H. M. and Hanneman, R. E., "Crystallization of Diamond and Graphite," *The Journal of Chemical Physics*, Vol. 46, pp. 3668–3676, (May, 1967).

4. The partition or metal strip material should be pliable or deformable in order to allow for diamond or CBN crystal compaction and the transmission of pressure more efficiently. When stiff preformed cemented carbide was used as a barrier or metal strip, efficient sintering was difficult because the relatively incompressible carbide walls hindered pressure transmission to the abrasive crystals.

This improved process permits the pressing of diamond or CBN compacts to the desired shape with little or no finishing steps required. A compact is removed from the high pressure apparatus, and the shied metal sleeve and any adhering metal from the shield metal cup or disc are removed in the usual manner (e.g., peeling off, grinding or lapping). At this point, the compacts comprise polycrystalline diamond or CBN having embedded therein one or more pieces of material in basically the same shape as the partition strips which were placed into the reaction volume of the high pressure cell. Where thermally stable components are desired, the compacts recovered from the cell are further treated by the process of U.S. Pat. No. 4,224,380. For example, they could be contacted first with a hot medium comprising nitric acid and hydrofluoric acid and secondly with a hot medium comprising hydrochloric acid and nitric acid (see example III of U.S. Pat. No. 4,224,380). By exposing the compacts to this bulk acid treatment, the embedded partition strips are removed and the compact discs are separated into smaller compacts of the various shapes described by the partition strips (e.g., cylinders, triangles, semi-circles, etc.). Besides having these pre-determined shapes, the smaller compacts are thermally stable as a result of the bulk acid treatment.

Mechanical removal of the partition strips is also possible by grit blasting, for example. However, the acid treatment is preferred because it is simple and is the same technique used to remove the infiltrated catalyst (e.g., cobalt) in the polycrystalline mass in order to obtain thermally stable compacts. This invention provides an efficient and practical method for the manufacture of thermally stable compacts. There are no shaping or cutting operations needed. Only the metal removal step by bulk acid treatment is required. Individual handling is virtually eliminated. This process improvement allows many pieces to be nested together in one high pressure cell and treated as a group during HP/HT operations. This is generally a less expensive and more convenient method of obtaining compacts in the desired shape than the conventional methods (e.g. laser and electrical discharge machining). In fact, it is referred to as "press to shape."

In the case where one does not perform the bulk acid treatment, the embedded partition strips (placed in non-working areas within the sintered mass) remain and serve as chip arresters which limit the movement of fractures within the polycrystalline diamond or CBN. The configuration of the strips will depend upon the maximum size chip allowable. The compact blanks are shaped as usual.

BEST MODE FOR CARRYING OUT THE INVENTION

Figure 1:
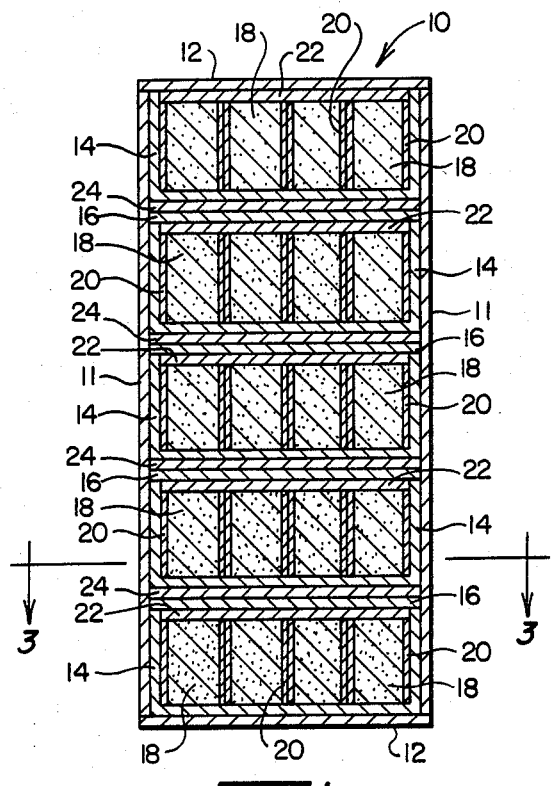
FIG. 1 is an elevation view in section of an HP/HT rection cell as modified by the improvement of the invention.

The feasibility of placing partitions within the sintered diamond mass was first tested in the cobalt sweep through process by embedding molybdenum, Monel nickel copper alloy (Monel is a trademark of International Nickel Co.) and stainless steel wire mesh into the diamond powder in a composite compact tool blank cell. The results confirmed the possibility of the partition strip method. Molybdenum and the Monel nickel copper alloy exhibited acceptable results, but stainless steel had delamination and chippage problems. The latter situation was the result of the steel reacting with the protecting shield metal cup and allowing the salt to penetrate and contaminate the diamond.

Tantalum and titanium tubes (0.200 inch or 5.08 mm outside diameter) were cut into 3.81 mm lengths, placed in the normal zirconium shield metal cups, filled with diamond powder (about 6-8 microns largest dimension) covered with cobalt catalyst discs and loaded into a HP/HT reaction cell. Using this method with tubes of different shapes, cylindrical, triangular, and star shaped pieces were obtained.

After those runs, nickel, iron and zirconium tubes with 1.6 mm internal diameter were cut to length, loaded with diamond in typical HP/HT cells and pressed. The nickel tubing appears to be very compatible with the cobalt catalyst sweep through method. Zirconium is acceptable but more expensive.

Ultimate compression tests of leaches samples from the iron and nickel partition runs were made, and the results are $8.30 \times 10^5$ psi ($5.72 \times 10^6$ kilopascals (kPa) for the nickel partition and $7.40 \times 10^5$ psi ($5.10 \times 10^6$ kPa) for the iron partition pieces. Both numbers are an average of ten tests and had values to $10^6$ psi ($6.89 \times 10^6$ kPa).

Thus, the preferred partition materials, when using cobalt catalyst sweep through are iron and nickel, nickel being the most preferred. The materials which can be used as those from Groups III B, IV B, V B, VI B, VII B, and VIII of the periodic table and their alloys. Stainless steel is also acceptable if isolated from the shield metal cup. Although it is feasible to use cobalt itself or lower melting catalyst solvent (e.g. Invar iron-nickel alloy) materials or other lower melting point materials (e.g. copper) as partitions, they are not preferred.

In the case of closed shape partitions, the use of smooth-sided (e.g. continuous drawn) tubes may give more pieces per cell with the thinner tube walls.

A further aspect of this invention is the bonding together of several partitions describing closed shapes into a bundle. Sections can be severed from the bundle, which sections resemble a honeycomb. These honeycomb partition bundles represent an efficient means of packing the maximum number of partition strips for discrete small compacts into a given cell volume.

Such bundles may be made by diffusion bonding individual closed shapes together. Diffusion bonding is a method for attaching two or more metal shapes by thermally cycling the pieces which are in contact with each other to a temperature high enough to allow the metal to bond by solid state diffusion but not high enough to distort the shapes of the pieces. The materials are never brought to their melting point nor are they held at temperature long enough to promote volume of shape changes. The result is an integral unit composed of a plurality of the starting shapes. This unit can be cut to the desired thickness and used as a partition. This eliminates the need of individually handling the many small partitions when loading a high pressure cell.

For example, a multiplicity of nickel (melting point 1453° C.) tubes can be bonded into a structural unit by heating in a vacuum to 1200° C. for ten minutes. A quantity of clean nickel tubes (placed inside a hollow graphite rod in a vacuum furnace) is heated to 1200° C. under vacuum. A carbon coating is deposited on the tubes by introducing methane into the furnace (allowing vacuum to drop to about 28 in. Hg. gauge pressure) and allowing it to remain for about five minutes. Full vacuum and 1200° C. conditions are resumed, followed by a second introduction of methane, after which the furnace is allowed to cool and the tube bundle is removed.

The severing of sections from the tube bundle is conveniently done by wire electrical discharge machining (EDM). The carbon coating on the tubes helps to prevent distortion of very thin wall tubing during the wire EDM cutting. In the case of tubes having a wall thickness substantially greater than two mils, the carbon coating is not required to prevent distortion.

One preferred form of a HP/HT apparatus in which the compacts of this invention may be prepared is the subject of U.S. Pat. No. 2,941,428 (incorporated herein by reference) which is called a belt apparatus. It includes a pair of opposed cemented tungsten carbide punches and an intermediate belt or die member of the same material. The die member includes an aperture in which there is positioned a reaction vessel shaped to contain a charge assembly. Between each punch and the die there is a gasket assembly comprising a pair of thermally insulating and electrically nonconducting pyrophyllite members and an intermediate metallic gasket.

The reaction vessel, in one preferred form, includes a hollow salt cylinder. The cylinder may be of another material, such as talc, which (1) is not converted during HP/HT operation to a stronger, stiffer state (as by phase transformation and/or compaction) and (b) is substantially free of volume discontinuities occurring under the application of high temperatures and pressures, as occurs, for example, with pyrophyllite and porous alumina. Materials meeting the other criteria, set forth in U.S. Pat. No. 3,030,662 (Col. 1, l. 59–Col. 1, l.2, incorporated herein by reference) are useful for preparing the cylinder.

Positioned concentrically within and adjacent to the cylinder is a graphite electrical resistance heater tube. Within the graphite heater tube, there is concentrically positioned a cylindrical salt liner. The ends of the liner are fitted with salt plugs disposed at the top and bottom.

Electrically conductive metal end discs are utilized at each end of the cylinder to provide electrical connection to the graphite heater tube. Adjacent to each disc is an end cap assembly each of which comprises a pyrophyllite plug or disc surrounded by an electrically conducting ring.

Operational techniques for simultaneously applying both high pressures and high temperatures in this type of apparatus are well known to those skilled in the super-pressure art. Referring to FIG. 1, the charge (or reaction zone) assembly 10 fits within the space defined by the salt liner and the salt plugs. The assembly consists of a cylindrical sleeve 11 and caps 12 of shield metal selected from the group consisting of zirconium, titanium, tantalum, tungsten and molybdenum. Within the shield metal sleeve are one or more sub-assemblies each defined by a shield metal disc 16 and a shield metal cup 14.

A mass of abrasive crystals 18 (diamond, CBN or mixtures thereof) is disposed within the cavity defined by the cup and the disc. This mass may also contain graphite and/or a metal catalyst. A disc of catalyst solvent (e.g. cobalt) 22 is shown on top of the abrasive crystal mass, just underneath the shield metal disc.

The number of sub-assemblies within the reaction zone can be varied and is not critical. In FIG. 1, five sub-assemblies are shown and each one is separated by a separator disc 24 made of an inert material such as dehydrated mica.

If composite compacts are desired, a mass of sintered metal bonded carbide (e.g. titanium, tungsten, or tantalum carbide) or carbide powder with appropriate metal bonding medium (e.g. cobalt, iron or nickel) would also be placed within the sub-assemblies. In FIG. 1 this would appear as a disc or layer either on top of or underneath the abrasive crystal mass 18. The manufacture of composite compacts is well known, and more details may be found in U.S. Pat. No. 3,745,623.

Figure 2:
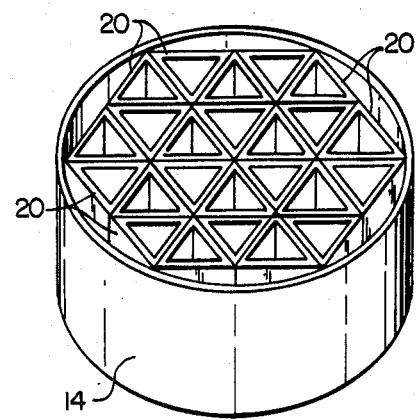
FIG. 2 is a perspective view of one of the shield metal cups from the cell in FIG. 1.

The partition strips of this invention are shown as elements 20 in the sub-assemblies. In the particular embodiment of FIGS. 1-3, the partition strips are triangular shapes which have been diffusion bonded together into a honeycomb pattern as described above. FIG. 2 shows clearly how the honeycomb partitions are placed into the shield metal cup during cell assembly.

Figure 3:
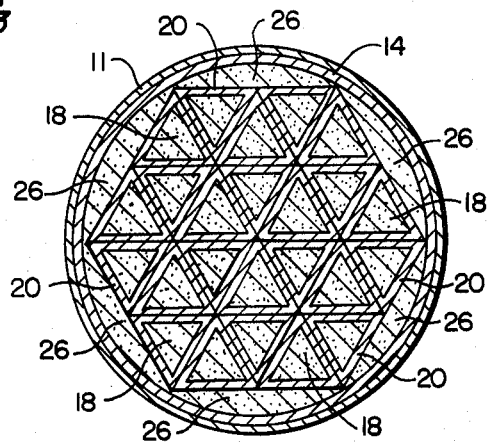
FIG. 3 is a plan view section taken through the reaction cell where indicated.

FIG. 3 shows how the individual triangular masses of abrasive crystals 18 are segregated. The abrasive grains which are outside of the tubular partitions will be designated interstitial diamond or CBN 26.

Figure 4:
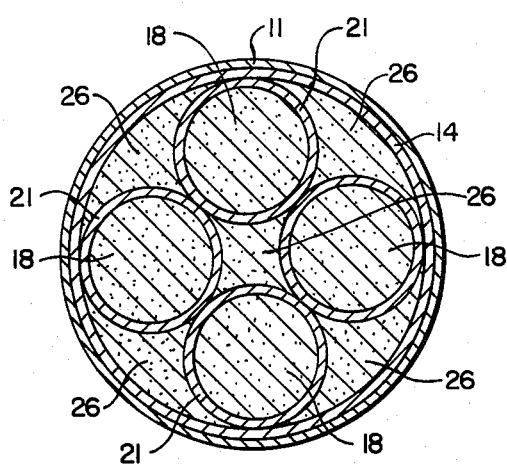
FIG. 4 is a plan view similar to FIG. 3, except that the partition strips are circular tubes instead of triangular tubes.

FIG. 4, of course, shows a variant of the partition shapes which utilizes four cylindrical tubes 21 rather than triangular shapes.

Another possible variation is to effectively double the number of compacts made in a given sub-assembly by placing a refractory metal disc (e.g. zirconium) midway through the sub-assembly. For example, such a zirconium disc would appear in a sub-assembly in FIG. 1 as a horizontal element dividing a given sub-assembly into top and bottom halves. Of course, the partition tubes would also be split in half. This technique will work if the catalyst solvent discs are placed one on either side of the zirconium disc or if the catalyst disc 22 remains where it is shown in FIG. 1.

Any unused volume within the charge assembly may be taken up with a disc made of the same material as the salt cylinder (e.g., sodium chloride) and discs made of hexagonal boron nitride to minimize the entry of underirable substances into the sub-assembly defined by the shield metal disc and cup.

Typical conditions of the HP/HT process are:
(1) for diamond (a) a pressure of at least 50 Kbars at a temperature of at least 1300° C. and within the diamond stable region; and (b) a reaction time of 3-120 minutes;

(2) for cubic boron nitride (a) a pressure of at least 42 Kbars at a temperature of at least 1300° C. and within the cubic boron nitride stable region; and (b) a reaction time of about 2-120 minutes.

The charge assembly is loaded into the reaction vessel which is placed in the HP/HT belt apparatus. First, the pressure and then the temperature are increased and held at the desired conditions for sufficient time for sintering to occur. It is important that the apparatus be brought to operating temperature only after operating pressure has been reached. If temperature is brought above the melting point of the catalyst before operating pressure has been reached, the sweep through would be commenced prematurely. The sample is then allowed to cool under pressure for a short period of time, and finally the pressure is decreased to atmospheric pressure, and the compact is recovered.

As stated in the background section, compacts may also be made using other carbon or boron nitride sources such as graphite, hexagonal boron nitride (HBN) or wurtzite boron nitride (WBN) as raw materials instead of diamond or CBN. When processed in accordance with the patents listed in the background section, these raw materials are converted into compacts. The processes are HP/HT processes using apparatus similar to that described above. The operating conditions are typically:

for graphite—50-62 kilobars, 1200°-1600° C., for 30 seconds to 40 minutes time, in the presence of nickel or cobalt catalyst;

for HBN—50-150 kilobars, 1800°-3000° C., for 1 to 30 minutes; and for WBN—suitable conditions are found in U.S. Pat. No. 3,876,751 which is incorporated herein by reference (e.g. 50-300 kbars, 1900°-2500° C., for 1 to 7 minutes).

The use of the partition strip improvement of this invention is also applicable when using these raw materials. One may use graphite or hexagonal boron nitride in the form of powder or pellets. It is also feasible to machine graphite or HBN rods to the shape which would fit within the space defined by the partition strip and the shield metal cup. There would be more volume change during the HP/HT process using these raw materials than there is either in the case of diamond or CBN, since there is an increase in density due to the phase change as well as the physical packing. This only serves to emphasize the importance of pliability in the partition strip material.

As stated earlier, after removal of any adhering cell materials from the compacts resulting from the HP/HT process, the recovered compacts comprise the polycrystalline mass of abrasive grains bonded together having embedded within the mass the partition strips, basically in the same shape as they were placed into the sub-assembly. Thus, for the charge assembly of FIGS. 1-3, the compacts at this point would resemble FIG. 3 without elements 11 and 14, the polycrystalline material and the partition strips being one integral mass. In order to make thermally stable compacts, this mass could be contacted first with a hot medium comprising nitric and hydroflouric and nitric acids. Substantially all of the partition strip and catalyst solvent material infiltrated into the compact body would be removed by this process if it were carried out for a sufficient length of time in accordance with the teaching of U.S. Pat. No. 4,224,380. The result would be 24 small triangular, thermally stable compacts per sub-assembly and 120 such compacts made per HP/HT run.

Figure 5:
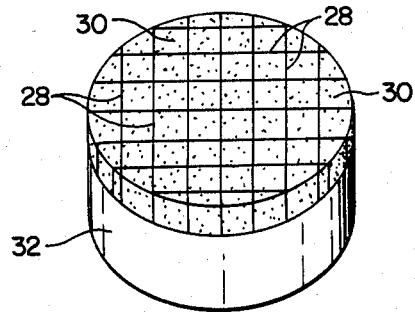
FIG. 5 depicts a composite compact in perspective, showing the chip arresters which are part of the invention.

FIG. 5 represents a composite compact made with a plurality of partition strips 28 arranged in a cross hatched pattern through the abrasive crystal layer. In applications such as rock drill bits, the size of chips knocked from the compact cutters would be limited by the embedded chip arresters (partition strips) to the shapes (e.g. small squares) described by the chip arrester configuration. Thus, for example, such a chip might be limited to a single piece 30 from the diamond layer rather than a massive portion of the whole layer.

Iron, nickel, and cobalt are the preferred metals for such chip arresters because they are relatively inexpensive, readily available, and do not form strong carbides like the refractory metals do. In the case of refractory metals, fractures may propogate more easily and continue into the neighboring subparts of the polycrystalline mass.

If desired, any exposed partition strips at the face or edge of a compact may be removed by grit blasting or selective etching in order to produce multiple, free standing polycrystalline diamond or CBN zones on the tool blank.

Another alternative would be to extend the chip arresters or partition strips into the cemented metal carbide substrate 32 of a composite compact during processing. This would effectively reduce chip propagation in the substrate. However, this technique may not work as effectively as the chip arrester concept in the diamond or CBN layer because metals such as nickel, cobalt and iron would probably diffuse into the metal carbide structure and, in the case of refractory metals, brittle carbides would probably be formed which would reduce their chip arresting properties.

Other embodiments of this invention will be apparent to those skilled in the art from a consideration of this specification or practice of the invention disclosed herein. Various omissions, modifications and changes to the principles described herein may be made by one skilled in the art without departing from the true scope and spirit of the invention which is indicated by the following claims.

I claim:

1. In a process for preparing a compact which comprises:
   A. subjecting a mass of abrasive crystals selected from the group consisting of diamond, cubic boron nitride and mixtures thereof, which mass is in contact with a source of metallic catalyst/solvent for recrystallization of the abrasive crystals, to conditions of temperature, pressure and time which result in a compact having intercrystal bonding between adjacent crystal grains;
   B. recovering the compact produced; and
   C. removing substantially all of the metallic phase from the compact of step B;
   the improvement which comprises:
   (i) forming the compact with a sub-divided crystalline mass by embedding within the mass of abrasive crystals at least one metallic partition strip of a given shape subdividing the abrasive crystal mass before the mass is subjected to the temperature and pressure conditions of step A, which partition strip is characterized by maintaining segregation between the separate portions of the abrasive crystal mass throughout step A and being sufficiently pliable not to resist the compaction of the abrasive crystal mass; and
   (ii) recovering a compact in step C having a shape described at least in part by the partition strip.

2. The improved process as recited in claim 1, wherein step C is accomplished by acid treatment.

3. The improved process as recited in claim 2 wherein the acid treatment comprises contacting the compact from step B first with a hot mixture of nitric and hydroflouric acids and secondly with a hot mixture of hydrochloric and nitric acids.

4. The improved process as recited in claim 1 wherein the partition strip material has a melting point at least slightly higher than that of the catalyst/solvent of step A under conditions of the high pressure/high temperature process in step A.

5. The improved process as recited in claim 1 wherein the mass of abrasive crystals and the catalyst/solvent source are placed within a protective shield metal enclosure disposed within the reaction zone of a high pressure/high temperature apparatus for carrying out Step A.

6. The improved process as recited in claim 1 wherein the partition strip material is selected from the group consisting of a Group III B, IV B, V B, VI B, VII B, and VIII metals and their alloys.

7. The improved process as recited in claim 1 wherein the partition strip material is selected from the group consisting of molybdenum, nickel-copper alloys, stainless steel, tantalum, titanium, iron, nickel and zirconium.

8. The improved process as recited in claim 1 wherein the partition strip material is selected from the group consisting of copper and its alloys.

9. The improved process as recited in claim 1 wherein the partition strip describes at least one closed shape.

10. The improved process as recited in claim 1 wherein the catalyst/solvent source comprises a catalyst/solvent material mixed with the abrasive crystals.

11. The improved process as recited in claim 1 wherein the catalyst/source comprises a mass of catalyst/solvent material in contact with the abrasive crystal mass.

12. In a process for preparing a compact which comprises:
   A. subjecting a mass of abrasive crystals selected from the group consisting of diamond, cubic boron nitride and mixtures thereof, thich mass is in contact with a mass of metal carbide containing a cementing agent which is a catalyst/solvent for recrystallization of the abrasive crystals, to conditions of temperature, pressure and time which result in a compact having intercrystal bonds between adjacent crystal grains; and
   b. recovering the composite compact produced; the improvement which comprises embedding within the mass of abrasive crystals, before it is subjected to the pressure and temperature conditions of step A, at least one partition strip extending through the shortest dimension of the abrasive crystal mass which partition strip is characterized by maintaining segregation between the separate portions of the abrasive crystal mass throughout step A and being sufficiently pliable not to resist the compaction of the abrasive crystal mass.

13. The improved process as recited in claim 12, wherein the partition strip material is other than the catalyst/solvent for the abrasive crystals used in step A.

14. The improved process as recited in claim 13 wherein the partition strip material has a melting point at least slightly higher than that of the catalyst/solvent of step A under conditions of the high pressure/high temperature process in step A.

15. The improved process as recited in claim 12 wherein the mass of abrasive crystals and the catalyst/solvent source have been placed within a protective shield metal enclosure which is disposed within the reaction zone of a high pressure/high temperature apparatus.

16. The improved process as recited in claim 15 wherein the reaction zone is cylindrical in shape, and at least one partition strip is oriented parallel to the axis of the reaction zone.

17. The process as recited in claim 12 which further comprises removing the exposed parts of the partition strips from the compacts recovered in step B in order to produce multiple, free standing polycrystalline abrasive crystal zones on the surface of the compact.

18. The improved process of claim 12 wherein the metal carbide is selected from the group consisting of tantalum carbide, titanium carbide, and tungsten carbide.

19. The improved process as recited in claim 12 wherein the partition strip material is selected from the group consisting of a Group III B, IV B, V B, VI B, VII B, and VIII metals and their alloys.

20. The improved process as recited in claim 12 wherein the partition strip material is selected from the group consisting of molybdenum, nickel-copper alloys, stainless steel, tantalum, titanium, iron, nickel and zirconium.

21. The improved process of claim 20 wherein the partition strip material is selected from the group consisting of nickel, iron and their alloys.

22. The improved process as recited in claim 12 wherein the partition strip material is selected from the group consisting of copper and its alloys.

23. The improved process as recited in claim 12 wherein the partition strips described closed shapes.

24. An improved composite compact comprising:
(a) a polycrystalline mass of abrasive grains selected from the group consisting of diamond, cubic boron nitride, and mixtures thereof bonded to a substrate material comprising
(b) a cemented metal carbide wherein the cementing agent is a catalyst/solvent, said abrasive grains, in random orientation, being directly bonded to adjacent crystal grains in said mass thereof by intercrystal bonding;
wherein the improvement comprises at least two partition strips subdividing the polycrystalline mass of abrasive grains, embedded within the polycrystalline mass and extending through its shortest dimension.

25. The improved composite compact of claim 24 in which the partition strips extend into the cemented metal carbide mass.

26. In a process for preparing a compact which comprises:
A. subjecting a raw material selected from the group consisting of graphite, hexagonal boron nitride and wurtzite boron nitride, in the presence of a catalyst for diamond crystallization in the case of graphite or for cubic boron nitride crystallization in the case of hexagonal boron nitride and wurtzite boron nitride, to conditions of pressure, temperature and time which result in a compact having a polycrystalline mass made of a material selected from the group consisting of diamond in the case of graphite raw material and cubic boron nitride in the case of hexagonal or wurtzite boron nitride raw material; and
B. recovering the compact produced;
the improvement which comprises forming a compact with a subdivided polycrystalline mass by embedding within the raw material, before it is subjected to the pressure and temperature conditions of step A, at least one partition strip characterized by maintaining segregation between the separated portions of the raw material throughout step A, and being sufficiently pliable not to resist compaction of the raw material during step A.

27. The improved process as recited in claim 26 wherein the partition strip material is other than the catalyst/solvent for the abrasive crystals used in step A.

28. The improved process as recited in claim 27 wherein the partition strip material has a melting point at least slightly higher than that of the catalyst/solvent of step A under conditions of the high pressure/high temperature process in step A.

29. The improved process as recited in claim 26 wherein the partition strip material is selected from the group consisting of a Group III B, IV B, V B, VI B, VII V, and VIII metals and their alloys.

30. The improved process as recited in claim 26 wherein the partition strip material is selected from the group consisting of molybdenum, nickel-copper alloys, stainless steel, tantalum, titanium, iron, nickel and zirconium.

31. The improved process of claim 30 wherein the partition strip material is selected from the group consisting of nickel, iron and their alloys.

32. The improved process as recited in claim 26 wherein the partition strip material is selected from the group consisting of copper and its alloys.

33. The improved process as recited in claim 26 wherein the partition strip describes at least one closed shapes.

34. The improved process as recited in claim 1 wherein the mass of abrasive crystals and the source of catalyst/solvent have been placed within a protective shield metal enclosure which is disposed within the reaction zone of a high pressure/high temperature apparatus which reaction zone is cylindrical in shape and wherein at least one partition strip is oriented parallel to the axis of the reaction zone.

35. The improved process of claim 26 wherein the raw material and the catalyst have been placed within a protective shield metal enclosure which is disposed within the reaction zone of a high pressure/high temperature apparatus which reaction zone is cylindrical in shape, and wherein at least one partition strip is oriented parallel to the axis of the reaction zone.

36. The improved process as recited in claim 12 wherein at least two partition strips extend through the shortest dimension of the abrasive crystal mass.

37. The improved composite compact of claim 24 in which at least two partitions strips subdividing the polycrystalline mass.

* * * * *